March 29, 1960 W. W. BAKKE ET AL 2,930,716
CREASE RESISTANT RESIN COMPOSITION FOR TEXTILES
Filed Oct. 12, 1956
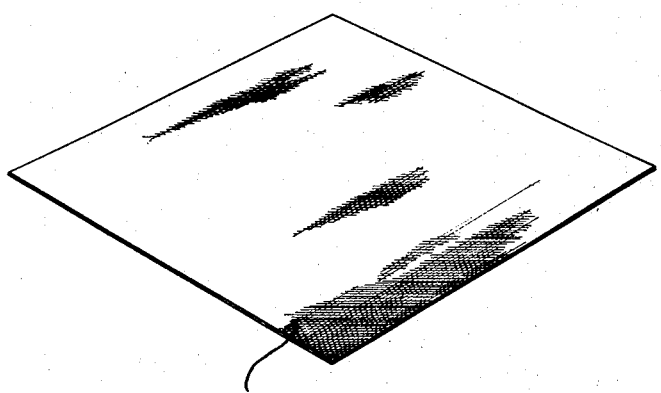
Textile fabric provided with crease resistant finish comprised of thermoset resinous adduct of formaldehyde and tetrahydro-5-hydroxy-2(1H)-pyrimidone.
INVENTORS.
William W. Bakke
BY William F. Tousignant
Griswold & Burdick
ATTORNEYS

2,930,716
CREASE RESISTANT RESIN COMPOSITION FOR TEXTILES

William W. Bakke and William F. Tousignant, Midland, Mich., assignors to The Dow Chemical Company, Midland, Mich., a corporation of Delaware Application October 12, 1956, Serial No. 615,592

8 Claims. (Cl. 117—139.4)

This invention relates to new resins useful for impregnating-coating textiles, particularly cotton and rayon textiles; to textile-treating compositions; and to textiles treated with such compositions.

The resins with which the invention is concerned are adducts of formaldehyde with tetrahydro-5-hydroxy-2(1H)-pyrimidone. The pyrimidone is readily obtainable by condensing 1,3-diamino-2-propanol with urea, as is more fully described in our copending application, entitled "Preparation of Tetrahydro-5-Hydroxy-2(1H)-Pyrimidone," filed October 12, 1956, Serial No. 615,447, now abandoned.

The novel resins are thermoset compositions that in the uncured state are water-soluble; hence, are easily applied to fabrics, paper, and the like, in the form of aqueous solutions. The treated item is then dried and the resin is converted, that is, cured or set, by being heated at about 250° to 400° F. preferably about 325°, for a few minutes.

In the preparation of the resins, a convenient procedure involves forming an aqueous solution of the pyrimidone and formaldehyde or a formaldehyde-generating substance, the ratio of formaldehyde to pyrimidone being in the range of about 1:1 to 4:1 on a molar basis. The amount of water used is not critical and may be anywhere from about 30 percent to 98 percent by weight of the composition. In other words, the resin-forming constituents may make up from about 2 to 70 percent of the composition.

Since the formaldehyde and pyrimidone react best to form the resin in an acidic medium, it is usually desirable to add to the aqueous solution of reagents sufficient acidic catalyst to provide a pH of about 2 to 7. Suitable catalysts include phosphoric, adipic, citric and tartaric acids and the mineral acid salts of amines or alkanolamines, such as isopropanolamine hydrochloride. The amount of such catalysts used is usually in the range of 4 to 10 percent by weight based on the resin-forming reagents used, this being the amount to achieve the desired pH of about 2 to 7.

The water-soluble, heat-convertible adduct formed when formaldehyde and the pyrimidone are mixed in a neutral or acid aqueous solution is converted to an insoluble, thermoset resin by being dried and heated. Thus the aqueous solution of the soluble resin may be used to coat or impregnate fabrics, paper and the like, the coated object is then dried, and the resin is converted to the insoluble form by heating the treated object at about 250° to 400° F. for about 1 to 5 minutes. Such treatment confers exceptional crease resistance or wrinkle resistance on the common fabrics and imparts high wet-strength to paper. Fabrics that may advantageously be treated in this manner include those made of cotton, wool, viscose and acetate rayon, and acrylic, polyamide, polyester and the like synthetic materials. The preferred class of fabrics are those comprising cellulosic fibers, that is, cotton, viscose and acetate rayon, and the like.

If the aqueous solution of soluble resin is to be used for impregnating cloth, paper or other porous material, it is usually desirable to adjust the resin solution to a concentration of about 5 to 30 percent solids, preferably about 5 to 15 percent, to facilitate wetting and impregnation of the fabric and to aid in controlling the pick-up of resin by the fabric. The pick-up should generally be in the range of about 5 to 15 percent by weight. It is generally advantageous to add a surfactant material to the resin solution to facilitate quick and uniform penetration and wetting by the solution. Any surfactant that is stable and effective under the conditions of use is satisfactory, the preferred ones being the nonionics.

The practice of the invention is illustrated by the following example:

A solution of 50 parts by weight of tetrahydro-5-hydroxy-2(1H)-pyrimidone, 88 parts of 37 percent aqueous formaldehyde and 5.9 parts of 35 percent aqueous 2-amino-2-methyl-1-propanol hydrochloride in 419 parts of water was prepared. It had a pH of 4.6. Swatches of cotton sheeting were immersed in and thoroughly wet with the solution, squeezed out on wringer rolls, dried 5 minutes at 212° F. and cured 4½ minutes at 300° F. They were then washed with mild soap, dried for 10 minutes at 212° F. and weighed to determine the resin pick-up, which was found to be 8.6 percent. The wrinkle resistance was measured by the AATCC method 66–53 in which the sample is given a standard crease and the angle of recovery is noted after the creasing pressure is released. An angle of 0° indicates no recovery or no crease resistance while an angle of 180° indicates full recovery or perfect crease resistance. The angle of the untreated cloth was only 86° while that of the treated sample was 147°, showing that the resin had imparted excellent crease resistance to the cloth.

A major weakness of most crease-resistant resin treatments on fabrics is that the resin reacts with chlorine from bleaching solutions and the chlorine then weakens the fabric, and discolors the fabric on scorching. A test was made according to AATCC method 69–52 to determine the chlorine damage to the fabric. A treated sample and a blank were tested and there was no visible color change and no difference in appearance between the resin treated sample and the blank. The tensile strength of the scorched resin treated sample was just as high as the tensile strength of the resin treated sample which had not been bleached and scorched, thereby indicating that there is little or no chlorine damage to the fabric.

Results generally similar to those described in the above examples are obtained when other fabrics of cotton, wool, viscose or acetate rayon, nylon or other synthetic fibers are used instead of cotton sheeting; when other concentrations of resin-forming reagents in the range of about 2 to 70 percent are used; when the resin solution has other pH values in the range of about 2 to 7; when paraldehyde, trioxane or other formaldehyde-generating substances are used instead of formaldehyde; when other ratios of formaldehyde to pyrimidone in the range of about 1:1 to 4:1 are used or when other changes are made within the defined scope of the invention.

The accompanying drawing is a representation in perspective of a piece of fabric which has been provided with the crease resistant finish of the present invention.

We claim:

1. An aqueous solution of a heat-convertible resin comprising the reaction product formed by contacting 1 to 4 moles of formaldehyde with 1 mole of tetrahydro-5-hydroxy-2(1H)-pyrimidone in an aqueous medium having a pH of about 2–7.

2. A process for improving the crease resistance of a textile fabric comprising impregnating the fabric with the aqueous solution defined in claim 1, drying the impregnated fabric, and converting the resin thereon to the insoluble form by heating the fabric at about 250 to 400° F. until the resin is substantially converted.

3. A crease resistant fabric the fibers of which are substantially coated with a thermoset resin composition comprising the reaction product formed by the steps of (1) contacting 1 to 4 moles of formaldehyde with 1 mole of tetrahydro-5-hydroxy-2(1H)-pyrimidone in an aqueous medium having a pH of about 2–7 thus to form a soluble resin; (2) impregnating the fabric with a solution of the soluble resin formed in step 1; (3) drying the thus impregnated fabric, and (4) converting the soluble resin on the fabric to an insoluble resin by heating said fabric at about 250–400° F.

4. A process as defined in claim 2 wherein the fabric comprises a cellulosic fiber.

5. A process as defined in claim 2 wherein the fabric comprises cotton fiber.

6. A fabric as defined in claim 3 comprising a cellulosic fiber.

7. A fabric as defined in claim 3 comprising cotton fiber.

8. A fabric as defined in claim 3 the resin coating of which constitutes 5 to 15 percent by weight of the fabric.

References Cited in the file of this patent

UNITED STATES PATENTS

| | | |
|---|---|---|
| 2,088,227 | Battye et al. | July 27, 1937 |
| 2,304,624 | Burke | Dec. 8, 1942 |
| 2,332,303 | D'Alelio | Oct. 19, 1943 |
| 2,373,135 | Maxwell | Apr. 10, 1945 |
| 2,374,647 | Burke et al. | May 1, 1945 |
| 2,541,152 | Cairns | Feb. 13, 1951 |
| 2,641,584 | Martone | June 9, 1953 |
| 2,795,513 | Rossin | June 11, 1957 |